United States Patent
Beetz et al.

(10) Patent No.: US 12,317,008 B2
(45) Date of Patent: May 27, 2025

(54) SIMULATION DISPLAY SYSTEM, SPATIAL IMAGE LUMINANCE UNIFORMITY

(71) Applicant: The Boeing Company, Arlington, VA (US)

(72) Inventors: Steven Thomas Beetz, St. Louis, MO (US); Michael Vincent Rohr, High Ridge, MO (US); Harold R. Streid, St. Louis, MO (US)

(73) Assignee: The Boeing Company, Arlington, VA (US)

( * ) Notice: Subject to any disclaimer, the term of this patent is extended or adjusted under 35 U.S.C. 154(b) by 10 days.

(21) Appl. No.: 18/507,540

(22) Filed: Nov. 13, 2023

(65) Prior Publication Data

US 2024/0305755 A1   Sep. 12, 2024

Related U.S. Application Data

(60) Provisional application No. 63/488,781, filed on Mar. 7, 2023.

(51) Int. Cl.
*H04N 9/31* (2006.01)

(52) U.S. Cl.
CPC ......... *H04N 9/3182* (2013.01); *H04N 9/3191* (2013.01)

(58) Field of Classification Search
CPC .. H04N 9/3182; H04N 9/3191; H04N 9/3194; H04N 9/3147; G02B 27/0988
See application file for complete search history.

(56) References Cited

U.S. PATENT DOCUMENTS

| 2005/0078227 | A1* | 4/2005 | Kobayashi | H04N 5/20 348/E5.073 |
| 2005/0287449 | A1 | 12/2005 | Matthys et al. | |
| 2006/0007239 | A1* | 1/2006 | Harrison | G09G 5/02 345/590 |
| 2006/0055830 | A1* | 3/2006 | Sakashita | H04N 9/3182 348/678 |
| 2007/0290996 | A1* | 12/2007 | Ting | G06F 3/0418 345/157 |

(Continued)

OTHER PUBLICATIONS

European Patent Office Extended Search Report, dated Jun. 19, 2024, regarding Application No. EP23217591.9, 14 pages.

*Primary Examiner* — Michael Lee
(74) *Attorney, Agent, or Firm* — Yee & Associates, P.C.

(57) ABSTRACT

Generating luminance uniformity in a rear projection display system is provided. The method comprises calculating luminance generated by a projector on a rear projection screen relative to a design eye position in front of the screen. A baseline luminance is determined for each primary color according to the luminance. Luminance of all locations on the screen is corrected toward the baseline. Correction is allocated between an optical filter and electronic correction. Luminance is measured at calibration points on the screen. The electronic correction for a color image is adjusted according to the allocation and the luminance at the calibration points to produce a corrected color image for projection from the projector. The corrected color image is projected from the projector and through the optical filter. The optical filter is configured to dim specified areas within the corrected color image according to the allocation.

20 Claims, 10 Drawing Sheets

(56) References Cited

U.S. PATENT DOCUMENTS

| | | | |
|---|---|---|---|
| 2014/0104581 A1* | 4/2014 | Yoshimura | G03B 21/26 353/30 |
| 2015/0130827 A1* | 5/2015 | Mizushiro | H04N 9/3182 345/589 |
| 2018/0176523 A1* | 6/2018 | Takasu | H04N 9/3111 |
| 2019/0342530 A1 | 11/2019 | Beier et al. | |
| 2021/0029332 A1 | 1/2021 | Hsiao | |
| 2023/0314222 A1* | 10/2023 | Beetz | G09G 3/006 356/402 |

* cited by examiner

SIMULATION DISPLAY SYSTEM, SPATIAL IMAGE LUMINANCE UNIFORMITY

CROSS-REFERENCE TO RELATED APPLICATION

This application claims the benefit of U.S. Provisional Patent Application Ser. No. 63/488,781, filed Mar. 7, 2023, and entitled "Simulation Display System, Spatial Image Luminance Uniformity," which is incorporated herein by reference in its entirety.

GOVERNMENT SUPPORT STATEMENT

This invention was made with Government support under Contract Number FA8617-18-D-6219 and Contract Number FA8617-18-F8001 awarded by the Department of Defense. The Government has certain rights in this invention.

BACKGROUND INFORMATION

1. Field

The present disclosure relates generally to rear projection display systems, and more specifically, to a method of generating luminance uniformity.

2. Background

Luminance uniformity is a desirable characteristic of a visual display. It is a measure of how much the luminance varies over the viewing area of the display, usually expressed as a percent variation from some nominal point in the display or the mean of the luminance variation taken over the whole area of the display.

Projection display systems inherently have a degree of non-uniformity to them in terms of luminance. Rear projection systems, such as those for flight simulation systems, utilizing curved screens can exacerbate this phenomenon due to various parameters such as opacity of the material, non-unity gain diffusion, and change in effective throw distance.

Therefore, it would be desirable to have a method and apparatus that take into account at least some of the issues discussed above, as well as other possible issues.

SUMMARY

An illustrative example provides a method of generating luminance uniformity in a rear projection display system. The method comprises calculating luminance generated by a projector on a rear projection screen relative to a design eye position in front of the rear projection screen. A baseline luminance value is determined for each primary color according to the calculated luminance. Luminance of all locations on the rear projection screen is corrected toward the baseline luminance value. Correction toward the baseline values is allocated between an optical filter and electronic correction. Luminance is measured at a number of calibration points on the rear projection screen, wherein the calibration points are at fixed azimuth and elevation locations on the rear projection screen. The electronic correction for a color image is adjusted according to the allocation and the luminance at the calibration points to produce a corrected color image for projection from the projector. The corrected color image is projected from the projector and through the optical filter. The optical filter is configured to dim specified areas within the corrected color image according to the allocation.

Another illustrative example provides a system of generating luminance uniformity in a rear projection display system. The system comprises a storage device that stores program instructions and one or more processors operably connected to the storage device and configured to execute the program instructions to cause the system to: calculate luminance generated by a projector on a rear projection screen relative to a design eye position in front of the rear projection screen; determine a baseline luminance value for each primary color according to the calculated luminance, wherein luminance of all locations on the rear projection screen is corrected toward the baseline luminance value; determine an allocation between an optical filter and electronic correction to perform the correction to the baseline luminance value; measure luminance at a number of calibration points on the rear projection screen, wherein the calibration points are at fixed azimuth and elevation locations on the rear projection screen; and adjust, according to the allocation and the luminance at the calibration points, the electronic correction for a color image to produce a corrected color image for projection from the projector. An optical filter is positioned in a light path of the projector, wherein the optical filter is configured to dim specified areas within the corrected color image according to the allocation.

Another illustrative example provides a computer program product for generating luminance uniformity in a rear projection display system. The computer program product comprises a computer-readable storage medium having program instructions embodied thereon to perform the steps of: calculating luminance generated by a projector on a rear projection screen relative to a design eye position in front of the rear projection screen; determining a baseline luminance value for each primary color according to the calculated luminance, wherein luminance of all locations on the rear projection screen is corrected toward the baseline luminance value; determining an allocation between an optical filter and electronic correction to perform the correction toward the baseline luminance value; measuring luminance at a number of calibration points on the rear projection screen, wherein the calibration points are at fixed azimuth and elevation locations on the rear projection screen; adjusting, according to the allocation and the luminance at the calibration points, the electronic correction for a color image to produce a corrected color image for projection from the projector; and calculating, based on the allocation, a pattern of spatially varied opacity for the optical filter.

The features and functions can be achieved independently in various examples of the present disclosure or may be combined in yet other examples in which further details can be seen with reference to the following description and drawings.

BRIEF DESCRIPTION OF THE DRAWINGS

The novel features believed characteristic of the illustrative examples are set forth in the appended claims. The illustrative examples, however, as well as a preferred mode of use, further objectives and features thereof, will best be understood by reference to the following detailed description of an illustrative example of the present disclosure when read in conjunction with the accompanying drawings, wherein:

DETAILED DESCRIPTION

Figure 1:
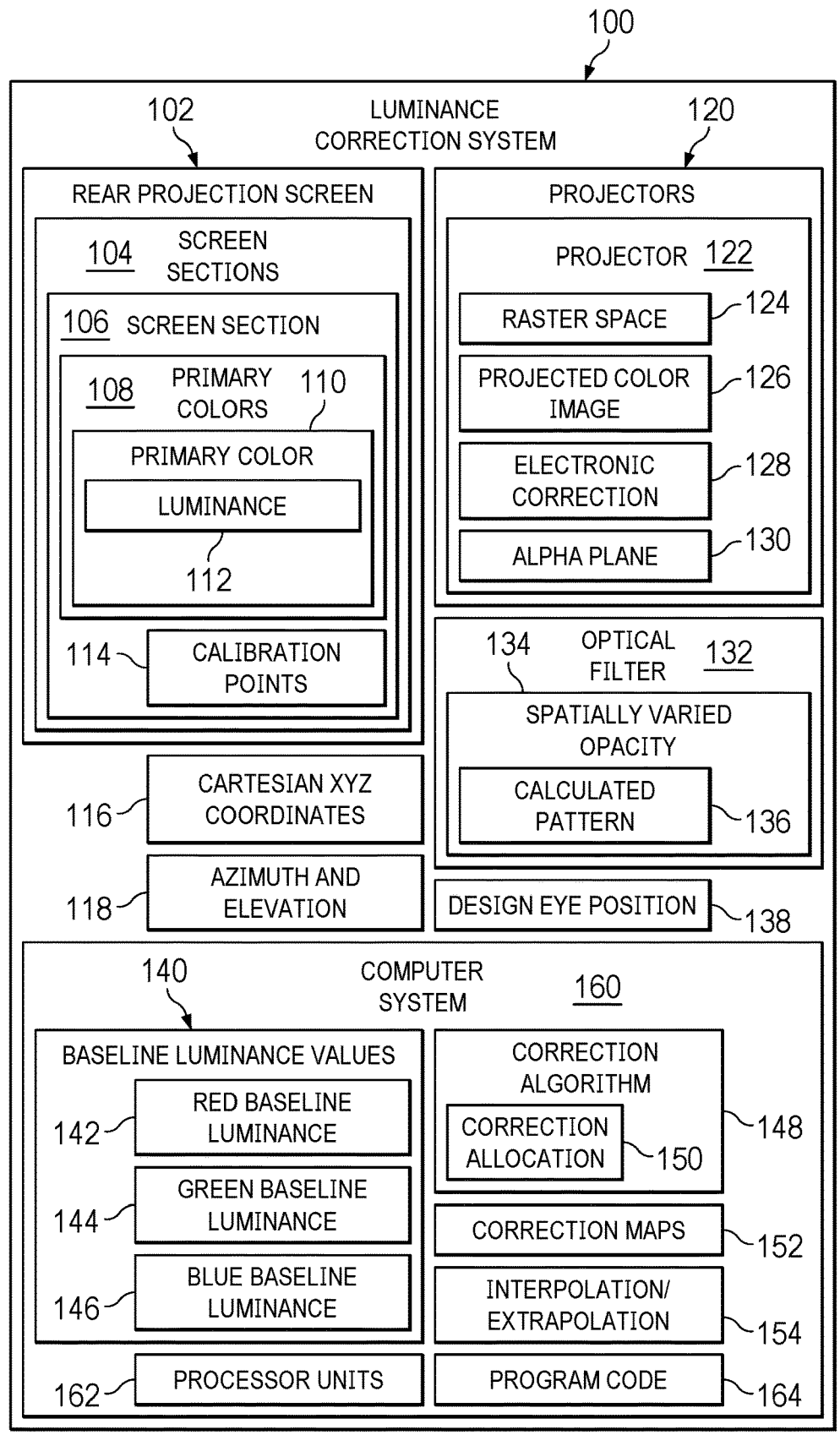
FIG. 1 is an illustration of a block diagram of a luminance correction system in accordance with an illustrative example.

The illustrative examples recognize and take into account one or more different considerations as described herein. For example, the illustrative examples recognize and take into account that projection display systems inherently have a degree of non-uniformity to them in terms of luminance. Rear projection systems, such as those for flight simulation systems, utilizing curved screens can exacerbate this phenomenon due to various parameters such as opacity of the material, non-unity gain diffusion, and change in effective throw distance.

The illustrative examples also recognize and take into account that existing image correction solutions leverage electronic correction or optical correction. Optical correction comprises acting directly upon the light emitted by the projector by optical means (i.e., reflection, refraction, diffraction, absorption etc.), rather than on the electronic signal that modulates the light through some sort of electro-optical transducer. In this case we are absorbing light selectively over a two dimensional cross section of the projection cone. Optical correction yields higher contrast ratios and the ability to utilize the full dynamic range of the projection device.

Electronic Correction refers to a method by which an electronic device in the system transforms the video signal in order to alter the projector's intended light output for the image. Electronic correction is more flexible and allows for real-time manipulation but causes degradation in contrast because the projection device cannot lower its black level luminance. Video projectors of the type used with rear projection create an image by modulating light in color and luminance from a full luminance white, projected cone of light. This modulation is performed by removing the luminance and color that is not desired at any particular location in the image. For various reasons, the projectors cannot reduce the luminance to zero, leaving a residual amount of light referred to as the "black level."

Dynamic range is the precision or number of discrete increments which can be exercised to control the luminance of the display over the full range from light to dark, usually expressed as the number of bits in the digital data. The dynamic range suffers as lowering luminance using an electronic method requires sacrificing the upper end of the projection device's dynamic range, wherein the projection device will no longer utilize the highest bit levels of the video signal because the electronic correction effectively constricts the signal's total range. For example, a projection device may typically use 0-255 as numeric values for increments to process video signals. When electronic correction is applied, that range may be restricted down to 0-200.

Color bit depth is the dynamic range of each color expressed as the number of bits used to control its luminance. Electronic correction may also cause banding due to limited color bit depth depending on the implementation situation with increasing likelihood as larger amounts of correction are included.

The illustrative examples provide a method of calculating the luminance uniformity correction required for any given point on a visual display system composed of rear projection screens. The method combines optical correction with an electronic alpha plane correction, providing better contrast and dynamic range performance than electronic correction alone. The alpha plane is a stored pattern of luminance modulation that is applied by electronic means to spatially modulate the light.

With reference now to FIG. 1, an illustration of a block diagram of a luminance correction system is depicted in accordance with an illustrative example.

Luminance correction system 100 comprises a rear projection screen 102 and a number of projectors 120. Each projector 122 in the number of projectors 120 generates a projected color image 126 that is projected onto the rear projection screen 102.

Rear projection screen 102 comprises a number of screen sections 104. Each screen section 106 has a respective projected color image 126 projected onto it by a corresponding projector 122 among projectors 120. The light emanating from a screen section 106 among the screen sections 104 has primary colors 108 (red, green, blue (RGB)) comprising the projected color image 126 projected onto that screen section. Each primary color 110 has a luminance value 112 (measured in foot lamberts or nits), which may vary over the screen section 106. A number of calibration points 114 can be designated on each screen section 106. These calibration points 114 can be chosen to align with user perspective and reconcile photometer spot sizes, etc.

Locations on rear projection screen 102 can be defined by Cartesian XYZ coordinates 116 as well as azimuth and elevation 118 relative to a design eye position 138 in front of the rear projection screen 102. Design eye position is a commonly used term in aviation human factors and refers to the nominal eye point of the operator. It is used as a reference for cockpit displays and avionics as well as to describe operator's view of the outside environment as restricted by aircraft and canopy structure (see FIG. 7).

Each projected color image 126 is defined according to a raster space 124 of each projector 122. Projector 122 is able to perform electronic correction 128 of projected color image 126 according to a defined alpha plane 130. Alpha plane 130 comprises a look up table of alpha transparency values for each primary color channel that enable gradations of opacity on a continuum.

Correction of luminance may also be performed by an optical filter 132 positioned in the light path of projected image 126. The opacity (transmission values) 134 of the optical filter 132 spatially varies according to a calculated pattern 136 determined by a correction allocation 150. The correction allocation 150 comprises a data description or file representing the transmission values as developed by a correction algorithm 148.

Computer system 160 is programmed to determine a baseline luminance values 140 for each of the primary colors 108 across rear projections screen 102, thereby establishing red baseline luminance 142, green baseline luminance 144, and blue baseline luminance 146. From these baseline luminance values 140, computer system 160 can create correction maps 152 for generating uniform luminance across all screen sections 104 of rear projection screen 102. Computer system 160 can determine an optimal correction allocation 150 between optical filter 132 and electronic correction 128. Computer system 160 can also perform interpolation/extrapolation 154 for the calibration points 114 to any location in projector raster space 124.

Computer system 160 is a physical hardware system and includes one or more computing devices. When more than one computing device is present in computer system 160, those computing devices are in communication with each other using a communications medium. The communications medium can be a network. The computing devices can be selected from at least one of a computer, a server computer, a tablet computer, or some other suitable computing device.

As depicted, computer system 160 includes a number of processor units 162 that are capable of executing program code 164 implementing processes in the illustrative examples. As used herein a processor unit in the number of processor units 162 is a hardware device and is comprised of hardware circuits such as those on an integrated circuit that respond and process instructions and program code that operate a computer. When a number of processor units 162 execute program code 164 for a process, the number of processor units 162 is one or more processor units that can be on the same computer or on different computers. In other words, the process can be distributed between processor units on the same or different computers in a computer system. Further, the number of processor units 162 can be of the same type or different type of processor units. For example, a number of processor units can be selected from at least one of a single core processor, a dual-core processor, a multi-processor core, a general-purpose central processing unit (CPU), a graphics processing unit (GPU), a digital signal processor (DSP), or some other type of processor unit.

Figure 2:
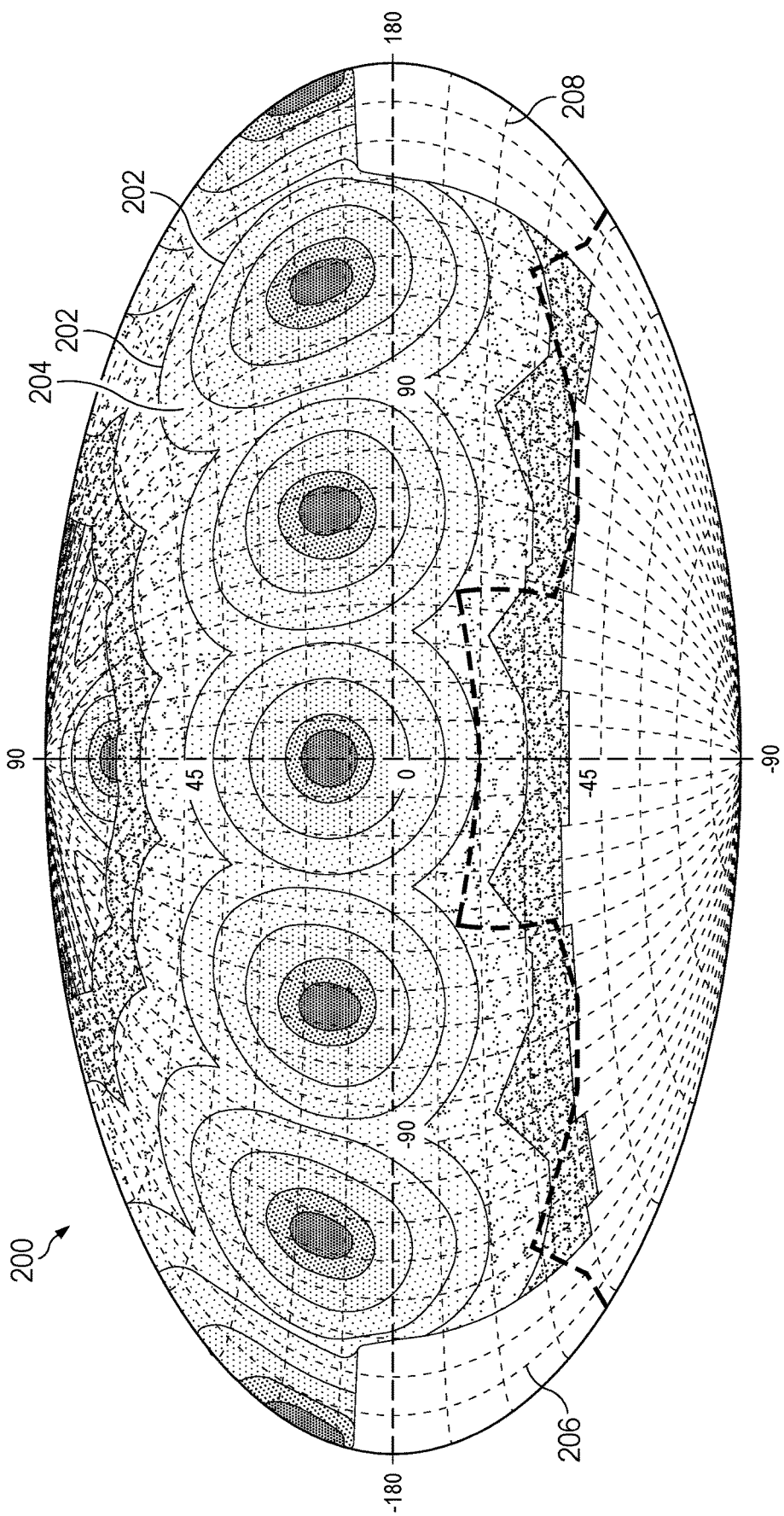
FIG. 2 depicts a diagram illustrating variation in luminance across a rear projection screen.

FIG. 2 depicts a diagram illustrating variation in luminance across a rear projection screen. Rear projection screen 200 comprises a number of screen section (e.g., see section 600 in FIG. 6). When connected together the segments form curved rear projection screen 200, which may be e.g., egg shaped or spherical. In the present example, curved rear projection screen 200 is presented unfolded in two dimensions similar to a world map.

As shown in FIG. 2, luminance values vary across the rear projection screen 200, typically having the highest values in the center of each projection from multiple projectors and dimming towards the edges. FIG. 2 can be thought of as a topographical map of image luminance. The concentric circles 202 represent contour lines for specific light intensities as they occur spatially. Shaded areas 204 between the circles 202 indicate light intensities that fall between the nearest contour lines.

Figure 3:
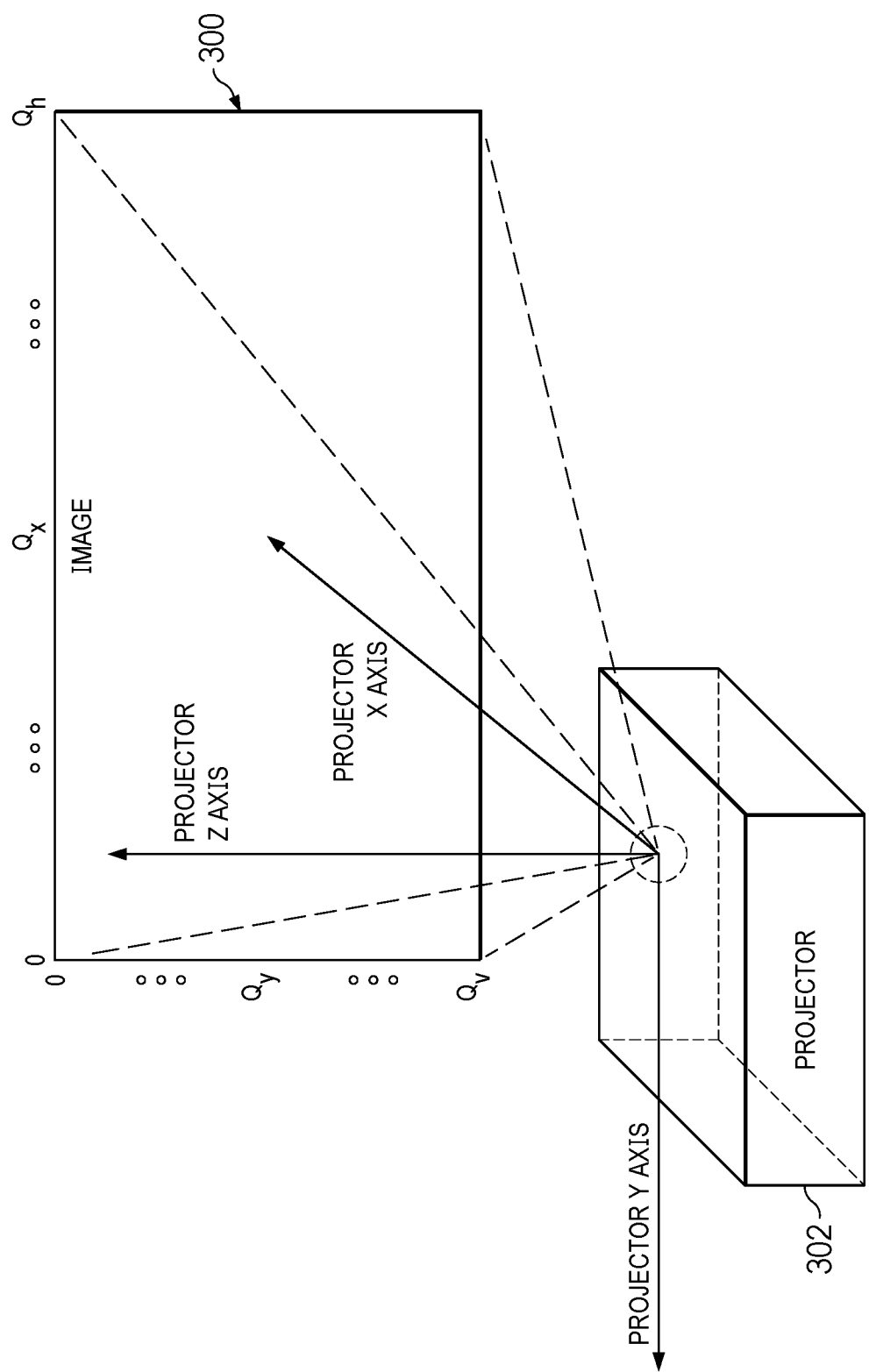
FIG. 3 depicts a diagram illustrating projector raster space.

In some projection systems such as, e.g., a Constant Resolution Visual System (CRVS), the screen has an egg shaped geometry (curved), while the projected light can be considered a rectilinear pyramidal shape intersecting with each screen composed of individual ray traces, as shown in FIG. 3. To compute the luminance or luminance of any given point on the screen the geometry and locations of these features are characterized relative to each. This characterization enables ray tracing equations or line-surface intersection equations to be utilized on discrete locations on the screen.

The illustrative examples find intersections or transformations between three spatial reference frames.

The first reference frame is projector raster space. FIG. 3 depicts a diagram illustrating projector raster space, which comprises a 2D coordinate system that can be found by bisecting the projection orthogonal to the projector's primary optical axis. This raster space is bounded and is typically described in terms of an x pixel and y pixel location. Range for the boundaries are typically described from 0 to the native number of pixels in the x direction and the y direction, respectively.

Box 300 represent an image and is representative of the bisection of the projection from projector 302. Box 300 serves as the bounding range. The variables $Q_x$ and $Q_y$ can be used together as an ordered pair describing a location in raster space. $Q_h$ and $Q_v$ represent the bounding values determined as the native number of pixels in the X and Y direction, respectively.

The second reference frame is Cartesian XYZ space, which comprises a 3D coordinate system defining the physical location of a projected point in real 3D space given as an x, y, and z offset distance from some origin point. This space is unbounded, and for present purposes, the design eye position (position of a user in the projection simulator) is considered the reference or origin of this reference frame.

The third reference frame is azimuth and elevation, which comprises a vector or range of vectors which originate at the design eye position and define a direction to a specific location in space (typically a location on a screen) but without regard to the distance or magnitude of the vectors. This reference frame can be thought of as typical spherical coordinates without radius being defined, bounded from −180° to +180° in azimuth, and −90° to +90° in elevation, as shown in FIG. 2. Azimuth is represented by lines 206 moving from the top of rear projection screen 200 to the bottom. Azimuth increments horizontally across the rear projection screen 200 from 0 at the center to +/−180 at each end. Elevation is represented by lines 208 moving left to right across the rear projection screen 200. Elevation increments vertically from 0 at the center to +/−90 at the top and bottom.

If one considers a projection screen that is a portion of a sphere with its center at a known offset from the design eye position, and a projector at some distance away (located on the opposite side of the screen surface compared to the spherical center) and pointed in a given direction towards the screen surface, it is possible to calculate the geometric correlation between projector raster space, Cartesian XYZ space, and azimuth/elevation space.

For a given pixel location in raster space, it is possible to determine the corresponding XYZ intersection with the screen surface and from that the corresponding azimuth and elevation relative to the design eye position. This determination starts by determining a given ray's direction relative to the projector based on an input pixel location, as well as parameters dictating the shape and attitude of the light cone such as throw ratio, image aspect ratio, and image/lens offset. The present discussion assumes that the optical axis of the projector 302 is co-linear with the X-axis of its own local coordinate system, a row of pixels is parallel to its local X-Y plane, and a column of pixels is parallel to its local X-Z plane.

The ray may be transformed based on the direction that the projector is facing relative to the global coordinate system using a standard heading, pitch, roll correction matrix. The origin vector is added to place the resultant vector appropriately relative to the design eye location.

The screen geometry and location relative to the design eye position may be defined as a sphere whose center is offset from the design eye position, as it represents the form of a single projection screen such as a CRVS system. Other screen geometries can be utilized including flat planar surfaces, tori, spheres centered at the design eye position, etc.

From the definitions of the light ray's vector and the screen surface, it is possible to find the Cartesian coordinate of the intersection. Converting from the X, Y, and Z Cartesian locations to an azimuth and elevation is simple due to the fact that the origin correlates to the design eye position.

The overall luminance (in foot lamberts or nits) across the rear projection screen is calculated prior to correction. Luminance may be calculated for each color individually due to the dependency of reflective losses on each color's polarization and spectrally dependent losses.

The amount of projected light from a projector with a flat (not deliberately spatially modulated by the projector) white field and peak illumination settings can be considered constant when thought of in luminous flux (measured in lumen), which is a measure of light emitted per unit of time. This value is typically provided with lumens as the unit and can be considered an amount of total light energy provided by the projector. This total light energy will remain constant regardless of the distance of projection and image size. However, the light energy will be spread over differing areas as the projection light cone (represented by the dotted line in FIG. 3) spreads out and covers increasing image areas from changes to magnification. The nominal instantaneous amount of illuminance, typically measured as foot candles, for a given point can be found as a function of the luminous flux, and the area of the projection cone generated for that corresponding magnification.

The example shown in FIG. 3 is one potential bisection. It is also possible to bisect the image closer to the projector or further away, which would cause the image to be smaller or larger in geometric size as a result. At each possible bisection, luminous flux remains constant, while other properties of light (such as illuminance, foot candles) vary, but can be calculated based on geometry and the constant luminous flux.

A curved screen is no longer a simple flat bisection of the image where magnification is the same across the field. Instead, there is greater magnification at the image extents where there is still constant luminous flux but spread across a greater area causing luminance to be lower than other areas of the screen that have lower magnification. Due to the curved nature of many simulation projection screens, the magnification increases substantially near the image extents and should be accounted for because increased magnification results in decreased luminance in the displayed image.

After calculating the luminance at any location point on the screen based on a few input parameters, the illustrative examples determine the correction to be applied for each point on the screen. A baseline luminance value is selected to which the rest of the measurements are normalized. For a rear projection, unblended, spherical surface screen the locations on the screen that have the lowest luminance typically are the corner edges and boundary locations, as shown in FIG. 2.

Selecting the minimum luminance for each color as the baseline luminance value by which to normalize other location points on the screen prevents overcorrecting based on the extreme extents of the image that do not actually end up projected onto a limited field of view screen. The percentage correction applied at each point on the screen is a simple ratio between the luminance at that point and the established baseline, with a maximum value of 1.

The luminance uniformity correction provided by the illustrative examples combines optical filters in the light path and electronic correction in the projector. Splitting the correction between an optical filter and electronic correction provides the ability to preserve dynamic range in the projector by limiting the amount of attenuation that is needed in the alpha plane. Preserving dynamic range allows for more accurate representation of, e.g., night scenes and NVG (night vision goggles) stimulation.

Figure 4:
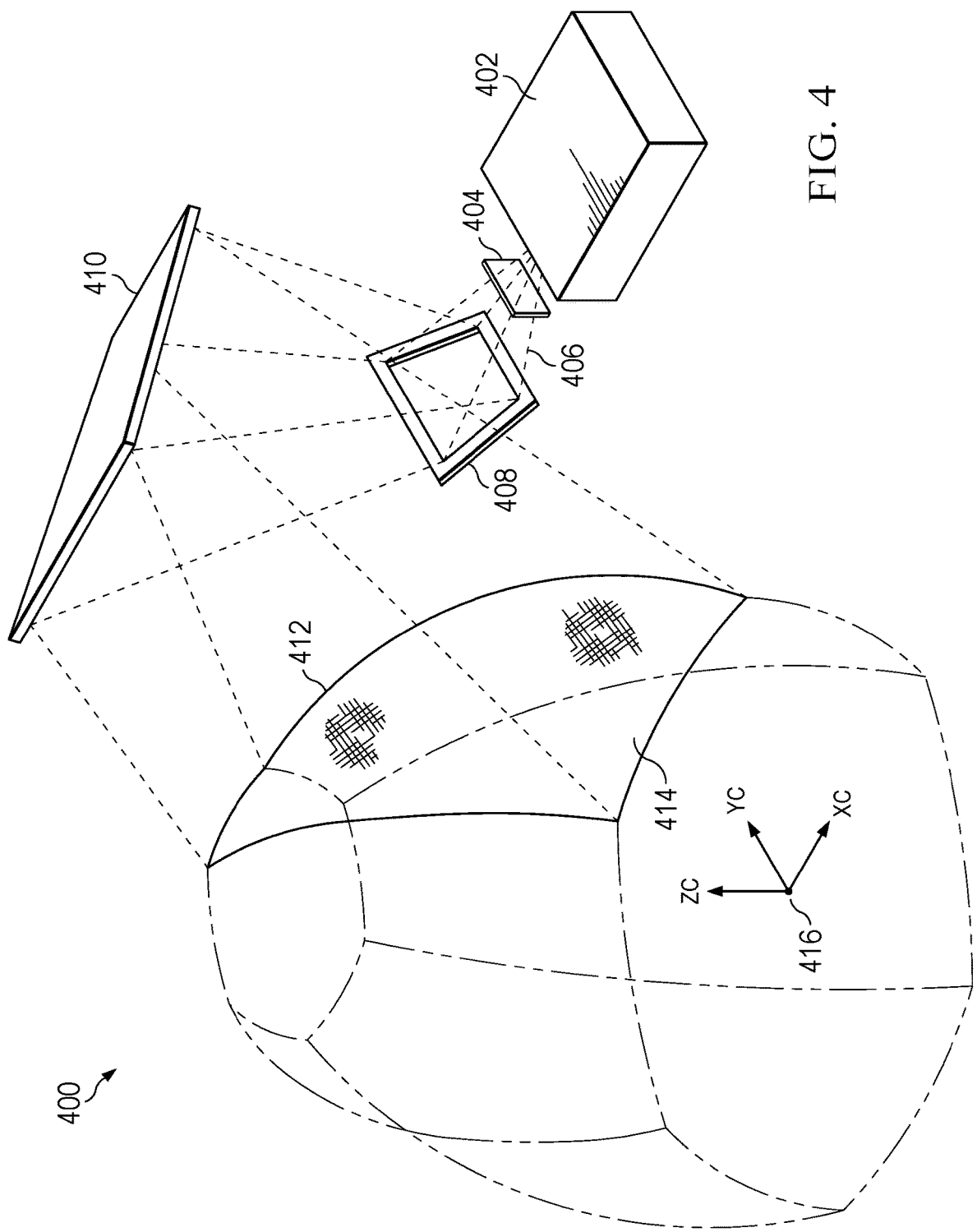
FIG. 4 illustrates a rear projector system employing an optical filter in accordance with an illustrative example.

FIG. 4 illustrates a rear projector system employing an optical filter in accordance with an illustrative example. As shown, optical filter 404 is located in the light path 406 of projector 402. After passing through the optical filter 404, the light may be reflected by a number of mirrors 408, 410 for rear projection of a corrected color image 414 onto a section 412 of rear projection screen 400, as shown in the present example.

Also shown in FIG. 4 is a design eye position 416 representing a position of an operator in front of the section 412.

Figure 5:
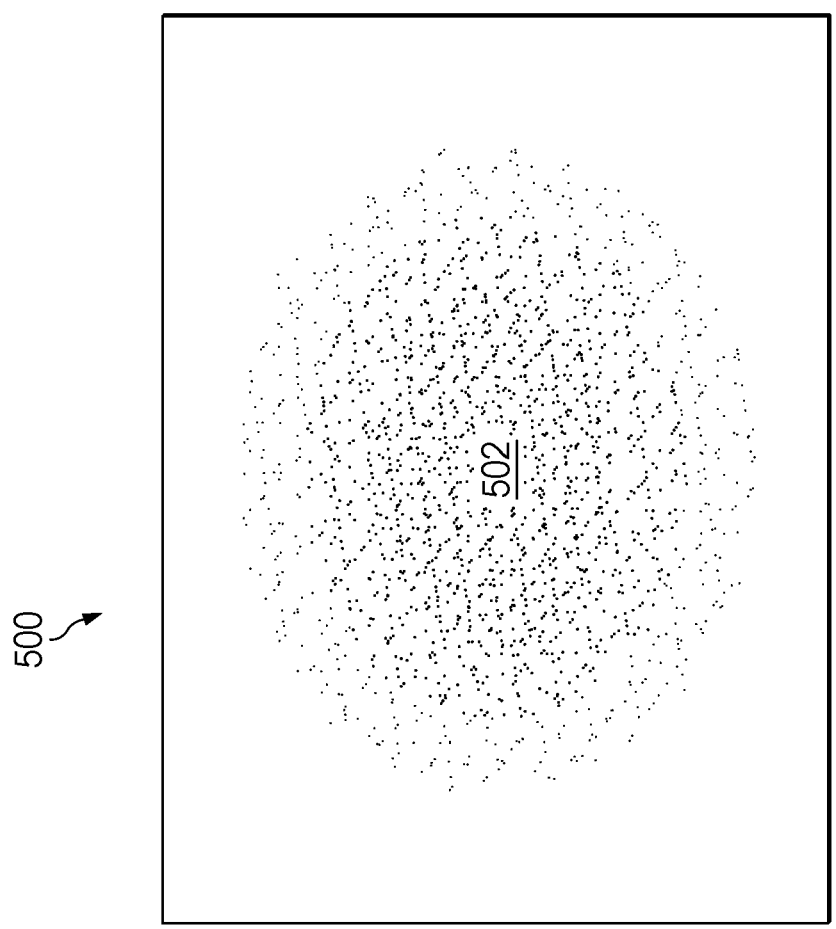
FIG. 5 is a pictorial representation of an optical filter in accordance with an illustrative example.

FIG. 5 is a pictorial representation of an optical filter in accordance with an illustrative example. Optical filter 500 may be an example of optical filter 404 in FIG. 4. Optical filter 500 is inserted into a projector light path to dim specified areas within the projected color image. The pattern of dimming 502 is static in nature and is an example of calculated pattern 136 in FIG. 1 having spatially varied opacity. Since optical filter 500 dims the image after the projector it maintains contrast and bit depth.

Overall luminance uniformity correction is based on what is understood about the projection system in question and requires calibration to account for manufacturing tolerances in the screen, projector, mirrors, lens, and mechanical setup.

The optical filter provides as much of the correction as possible without over attenuating the light from the projector. This approach provides the goal of obtaining the highest image luminance on screen from the projector light power while preserving the dynamic range of the image generated by the projector. The characteristics of the optical filter are designed to limit the amount of color alteration, have consistent NVG/photopic ratio, limit changes due to aging, provide reasonably full contrast modulation, and an accurate attenuation gradient based on design data. The optical filter allows all remaining luminance uniformity correction to be performed in the alpha plane designed into the projector without the introduction of any visual artifacts that might be caused by limited dynamic range of the projector if the alpha plane correction were increased to perform all of the required correction without help from the nominal optical correction. An example of such artifacts is banding (abrupt changes from one tone to another due to conversion of a continuous gradation of tone to several regions of fewer tones).

Care is taken when determining the luminance correction profile for the optical filter to avoid discontinuities or sharp transients when combined with the electronic correction such as any sudden changes in the amount of correction to be performed by each method. Sudden changes would require extremely precise alignment and manufacturing capability between electronic methods and optical methods to provide the intended result continuously. Misalignment might present itself as the appearance of darker or brighter areas that could be ring or crescent moon shaped.

Of particular interest are the areas that map to the outer corners of the screen (see, for example, points 2, 3, 4, and 5 in FIG. 6) or projections extents (see lines 702 in FIG. 7) where the amount of attenuation needed becomes very small, approaching zero, wherein the nominal correction is smaller than the precision of the optical manufacturing process and presumably would only be performed electronically to prevent over attenuation. Optical correction is static in nature and is subject to manufacturing tolerances. Therefore, it is recommended to only utilize electronic correction near those areas since it is adjustable, in order to prevent overcorrection and missing the total correction target. A transition may be required to phase in the optical attenuation in such a way as to avoid noticeable rings or patterns in the image.

Different methods may be used to allocate correction between the optical filter and electronic correction. One approach utilizes equal capacity wherein the common correction amount to be performed is calculated between each individual color. All correction that is common to all three primary colors is allocated to the optical filter. The remaining correction that is required on a per color basis to provide uniform color is performed electronically in the projector alpha plane. This method has the benefit of maximizing the dynamic range and potential contrast of the projector while allowing for the headroom (margin) to adjust electronically due to limitations built into the physical system or arising from manufacturing variation, including the optical filter.

This approach sacrifices maximum luminance of the system to add headroom to allow for variability. To add headroom, the electronic correction portion is de-rated by some percentage to all values, and the light source power output is increased by that same amount (effectively decreasing any aging factors or other headroom built into the system).

The equal capacity approach first determines the total amount of transmission required for the projector alpha plane for each color at each location. The maximum transmission of each color is taken for each alpha plane location, known as the "common alpha correction" (the amount of transmission/attenuation that all three primary colors achieve without over attenuating the imagery).

$$\text{commonalpha} = \max(\eta_{alpha,R}\eta_{alpha,G}\eta_{alpha,B})$$

Plotting the common alpha correction as a function of inclination angle from the optical center axis (f($\zeta$)) determines whether the optical filter will in fact have a radial shape about the projection axis. The plot is corrected to the maximum value for each specific inclination angle.

An altered curve is generated for each of the three primary colors, introducing a common refractive value:

$$\text{alpha}_{altered,Common} = \min[\max(\text{alpha}_{altered,R}\text{alpha}_{altered,G}\eta\text{alpha}_{altered,B}),1]$$

The optical filter value is set equal to the altered common curve.

$$f(\zeta) = \text{alpha}_{altered,Common}$$

The electronic portion of each color's correction is recalculated by dividing the original correction value by the optical filter value.

$$\eta_{alpha,R,Recalc} = \frac{\eta_{alpha,R}}{f(\zeta)}$$

$$\eta_{alpha,G,Recalc} = \frac{\eta_{alpha,G}}{f(\zeta)}$$

$$\eta_{alpha,B,Recalc} = \frac{\eta_{alpha,B}}{f(\zeta)}$$

Another approach to allocating correction between the optical filter and electronic correction comprises scaled reserve capacity (logarithmic). In this approach some approximate correction amount is reserved to be performed electronically, then the corresponding amount to be performed via the optical filter is determined, and finally the optical filter value is used to determine the actual projector correction amount on a per color basis. As a result, the system has an appropriate luminance uniformity as well as correction for nominal color shift. The amount reserved is design dependent and might vary, for example, between 10% and 30% reserved for electronic correction.

The scaled reserve capacity approach has the advantage of providing a smooth transition between the optical filter and the projector, while ensuring that there is some amount of correction available to work with to allow for variance within the system without having to increase light output through light source power controls or other means. This result in turn allows the system to achieve a higher maximum luminance than the equal capacity approach.

Scaled reserve capacity loses some dynamic range at the center of the image where a user will spend the bulk of time looking. It also is inflexible in the amount of overhead that is reserved.

The scaled reserve capacity approach first determines the total amount of transmission required for the projector alpha plane for each color at each location. The maximum transmission of each color is taken for each alpha plane location (common alpha correction).

$$\text{commonalpha} = \max(\eta_{alpha,R}\eta_{alpha,G}\eta_{alpha,B})$$

Again, plotting the common alpha correction as a function of inclination angle from the optical center axis (f($\zeta$)) determines whether the optical filter will in fact have a radial shape about the projection axis.

A desired cutoff level is determined for where the projector (electronic correction) should be doing all of the correction to prevent the optical filter from over attenuating the imagery. This value (END_PCT) may be expressed as a percent (e.g., 90%).

The amount of correction to perform in the projector at the center of the image is determined by selecting a value (START PCT) that is lower/smaller than END_PCT to allow for a smooth transition from center to image extents, e.g., 70%.

An altered curve is generated for each of the three primary colors, introducing a common refractive value and removing any eye position offsets:

$$\text{alpha}_{altered,Common} = \min[\max(\text{alph}_{aaltered,R}\text{alpha}_{altered,G}\eta\text{alpha}_{altered,B}),1]$$

An intersection point (CUTOFF ANGLE) of the END_PCT with one of the altered color curves is found. This intersection point is used to build a logarithmic function g(ζ) between START PCT and END_PCT.

From the altered common curve and the logarithmic curve the amount of correction to be performed by the optical filter is obtained through simple division.

$$f(\zeta) = \frac{\text{alpha}_{altered,Common}}{g(\zeta)}$$

Again, the amount of electronic correction is recalculated on a per color basis.

$$\eta_{alpha,R,Recalc} = \frac{\eta_{alpha,R}}{f(\zeta)}$$

$$\eta_{alpha,G,Recalc} = \frac{\eta_{alpha,G}}{f(\zeta)}$$

$$\eta_{alpha,B,Recalc} = \frac{\eta_{alpha,B}}{f(\zeta)}$$

By correcting luminance on a per primary color basis, the illustrative examples are able to achieve color uniformity in addition to overall luminance correction.

The projector alpha plane present on projectors may go by a variety of names such as, e.g., optical shading correction, characterized by the ability to assign spatially dependent attenuation to the output image relative to the input. However, the details of the capabilities may differ significantly among projectors. Similarly, the encoding and extents of the functions may vary from manufacturer to manufacturer.

Mapping may depend on the aspect ratio of the projector and the number of vertical and horizontal elements of the alpha plane. The data in the alpha plane may be used to control the illuminance of the output image based on this mapping.

Due to variations in the system, which will affect luminance uniformity, the illustrative examples provide a tuning map that works on top of the mathematically derived correction map (default map). This default map is generated based on the known characteristics of the system which includes the optical filter in the light path.

Figure 6:
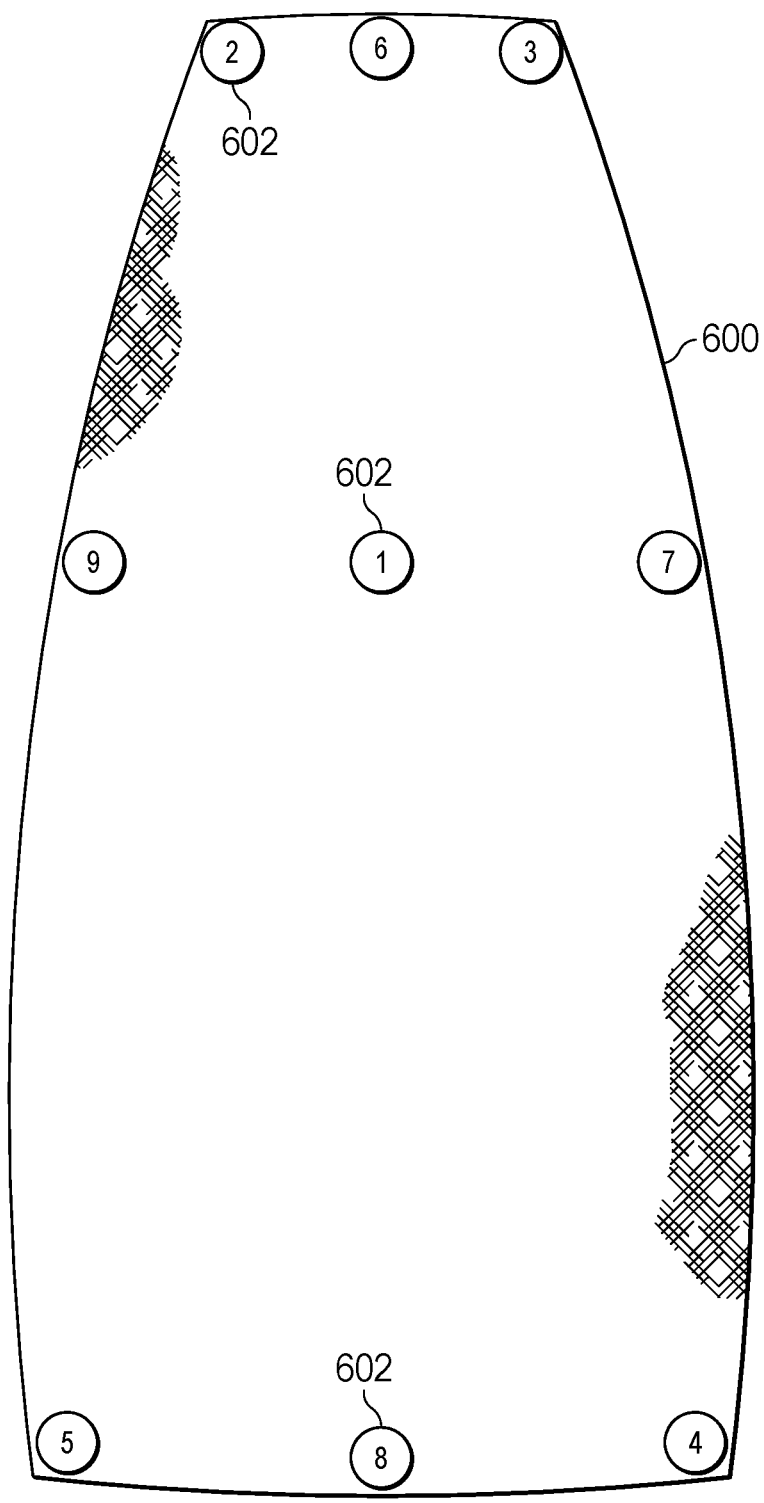
FIG. 6 depicts an illustration of a section of a rear projection screen with a number of calibration points in accordance with an illustrative example.

FIG. 6 depicts an illustration of a section of a rear projection screen with a number of calibration points in accordance with an illustrative example. Using a set of calibration points 602 spaced throughout the screen section 600, a set of three correction maps corresponding to primary colors of the projected light can be generated based on the measured luminance and color at each of the calibration points through the calibration process. A number of points located at fixed azimuth and elevation locations provide data points for the collection of this data.

Using calibration points in azimuth/elevation space (chosen to align with user perspective and reconcile photometer spot sizes, etc.), it is possible to perform active correction to the nominal correction profile calculated and applied at these calibration points. A user can actively measure the luminance and color at a given azimuth and elevation. Using the alpha plane directly, or knowledge of the alpha plane encoding or other related controls of the projector (such as global values that effectively do the same functions), the user can apply settings iteratively to the projector until the calibration point in question has the desired measurements. In the case where the alpha plane is not directly utilized, the other settings or parameters utilized may be decoded, re-encoded to alpha plane values, applied to the alpha plane, and the other settings returned to their initial states.

The actual locations of the calibration points may be tuned based on the shape, size, coverage area, and other geometric constraints of the screen and system (e.g., differing cockpit shapes and sizes which require moving the calibration points to be visible when a pilot is seated in the cockpit in question. The size of the measurement target may be considered and adjusted as well to provide mistake proofing. By positioning as small a measurement pattern as possible in a precise location of the calibration point to be measured (while allowing reasonable mechanical/personnel related drift in the aiming of the photometer) the previous calculations related to determining pixel location from only azimuth and elevation can be used. For example, with a one degree measuring angle photometer, a target size on the order of 5 degrees diameter may be used to allow for up to 2 degrees in aiming tolerance.

Data collected for each of the calibration points based on their azimuth and elevation location is mapped back to the projector raster space, so that it can be applied at the spatially correct location in the projector alpha plane, using the mathematical relationship described above.

The method described above applies if the projector alpha plane's adjustment locations in raster space align with the chosen azimuth and elevation of the calibration points and only corrects those specific locations. Interpolation and extrapolation are used to find a correction map for the entire field of view and have it map appropriately to the projector's allowed adjustment location.

With knowledge of the settings for the calibration points, a 2D exact interpolator/extrapolator can extend the results to any location in projector raster space. To make the process agnostic of projector control scheme, the interpolation may be performed on the decoded percentage of attenuation needed and not on actual encoded values. From this interpolator/extrapolator model, the values to attenuate in the actual projector alpha plane can be determined by feeding the interpolation/extrapolation model the coordinate locations for the projector's alpha plane. The output attenuation values can then be re-encoded into values and applied to the projector.

Figure 7:
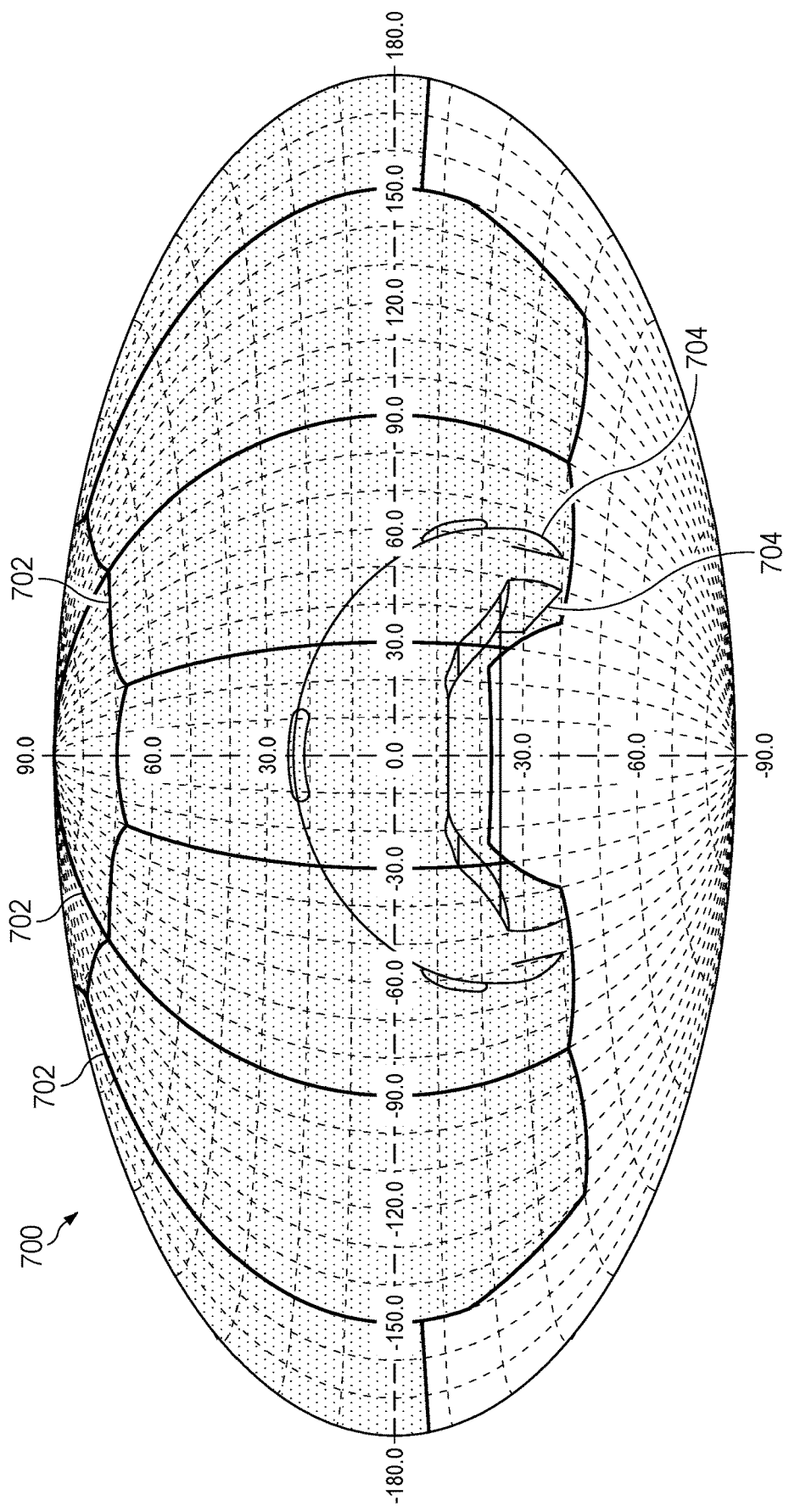
FIG. 7 depicts a diagram illustrating luminance uniformity across a rear projection screen in accordance with an illustrative example.

FIG. 7 depicts a diagram illustrating luminance uniformity across a rear projection screen in accordance with an illustrative example. By combining the optical filter and electronic correction according to the method described above, the luminance of light projected onto the rear projection screen 700 is uniform, in contrast to FIG. 2. Lines 704 represent canopy and aircraft structures that might restrict an operator's view.

Figure 8:
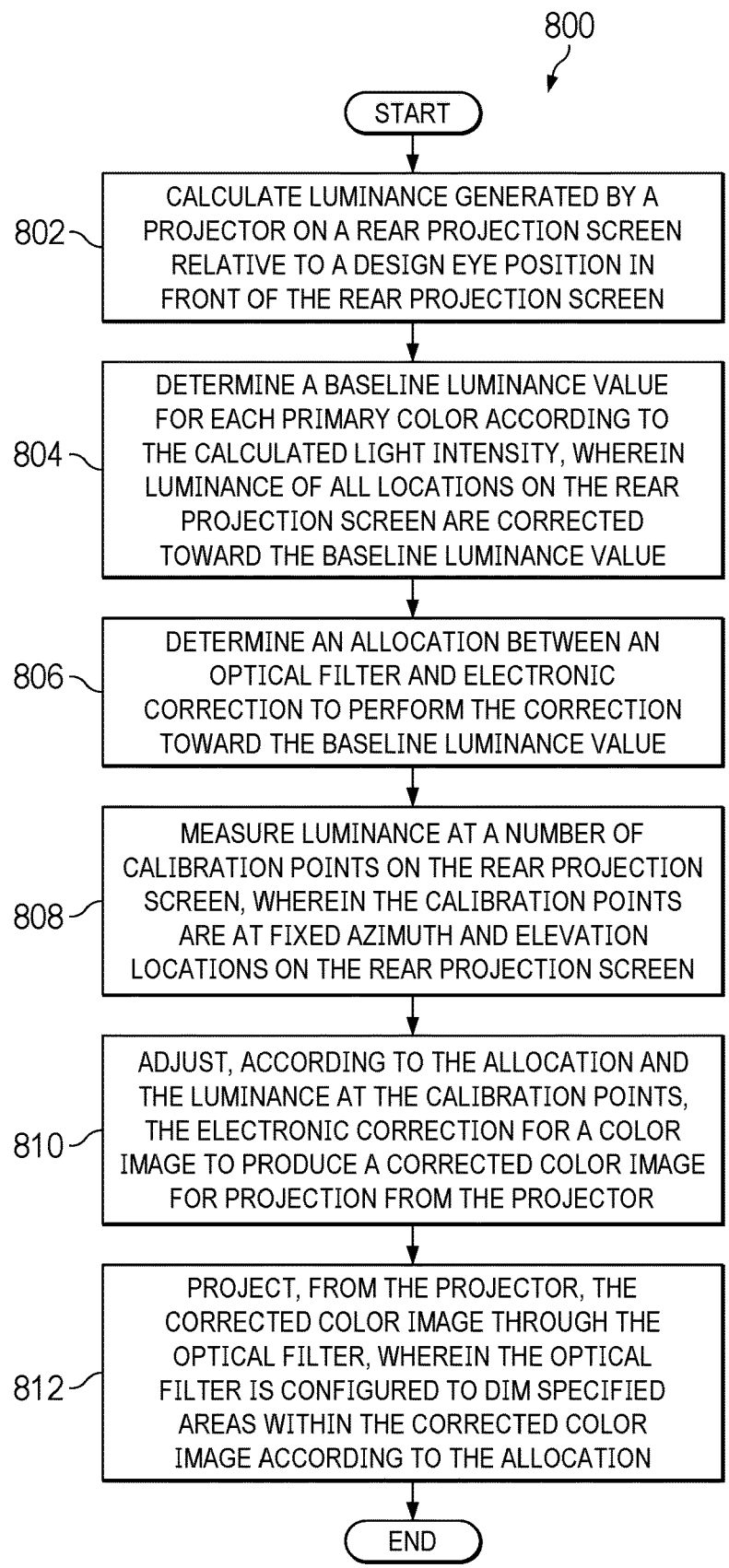
FIG. 8 depicts a flowchart of a process for generating luminance uniformity in a rear projection display system in accordance with an illustrative example.

FIG. 8 depicts a flowchart of a process for generating luminance uniformity in a rear projection display system in accordance with an illustrative example. The process in FIG. 8 can be implemented in hardware, software, or both. When implemented in software, the process can take the form of program code that is run by one of more processor units located in one or more hardware devices in one or more computer systems. For example, the process can be implemented in luminance correction system 100 in FIG. 1.

Process 800 begins by calculating luminance generated by a projector on a rear projection screen relative to a design eye position in front of the rear projection screen (operation 802). Calculating the luminance may be performed during calibration of the projector, either as a one-time set up procedure or to recalibrate the projector periodically.

A baseline luminance value for each primary color according is determined to the calculated luminance (operation 804). The luminance of all locations on the rear projection screen is corrected toward the baseline luminance value. The baseline luminance value for each primary color may comprise the minimum luminance for each primary color. Percentage correction applied at each point on the screen may comprise a ratio between the luminance at that point and the baseline luminance value.

Process 800 determines an allocation between an optical filter and electronic correction to perform the correction toward the baseline luminance value (operation 806).

Luminance is measured at a number of calibration points on the rear projection screen (operation 808). The calibration points are at fixed azimuth and elevation locations on the rear projection screen.

The electronic correction for a color image is adjusted according to the allocation and the luminance at the calibration points to produce a corrected color image for projection from the projector (operation 810). The electronic correction may be performed according to an alpha plane of the projector.

Adjusting the electronic correction may comprise creating a number of correction maps corresponding to primary colors generated by the projector based on measured luminance and color at each of the calibration points.

Data collected for each of the calibration points based on their azimuth and elevation location may be mapped back to raster space of the projector. Interpolation and/or extrapolation may be performed to extend results for the calibration points to any location in projector raster space, wherein the interpolation and/or extrapolation is performed on decoded percentage of luminance attenuation needed.

The projector projects the corrected color image through the optical filter, wherein the optical filter is configured to dim specified areas within the corrected color image according to the allocation (operation 812). The optical filter may comprise an opacity that varies spatially according to a calculated pattern based on the allocation.

Process 800 then ends.

Figure 9:
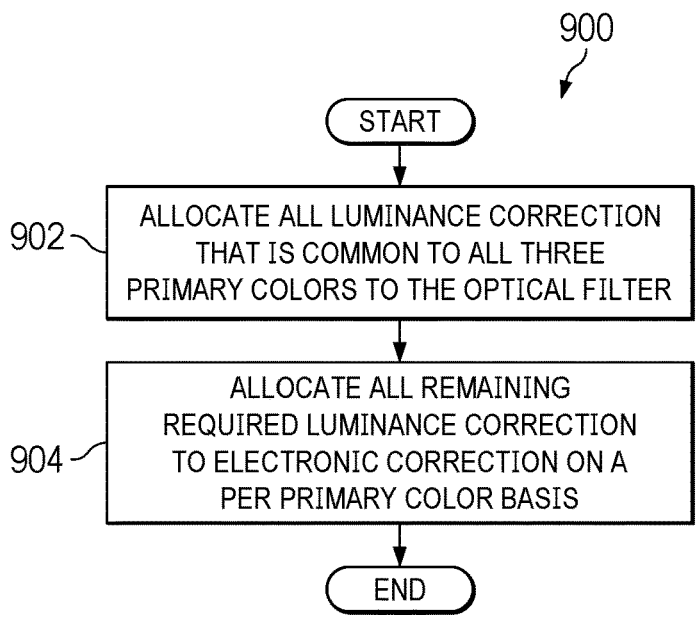
FIG. 9 depicts a flowchart of a process for allocation of luminance correction between the optical filter and electronic correction in accordance with an illustrative example.

FIG. 9 depicts a flowchart of a process for allocation of luminance correction between the optical filter and electronic correction in accordance with an illustrative example. Process 900 is example implementation of operation 806 in FIG. 8.

Process 900 begins by allocating all luminance correction that is common to all three primary colors to the optical filter (operation 902). All remaining required luminance correction is allocated to electronic correction on a per primary color basis (operation 904). Process 900 then ends.

Figure 10:
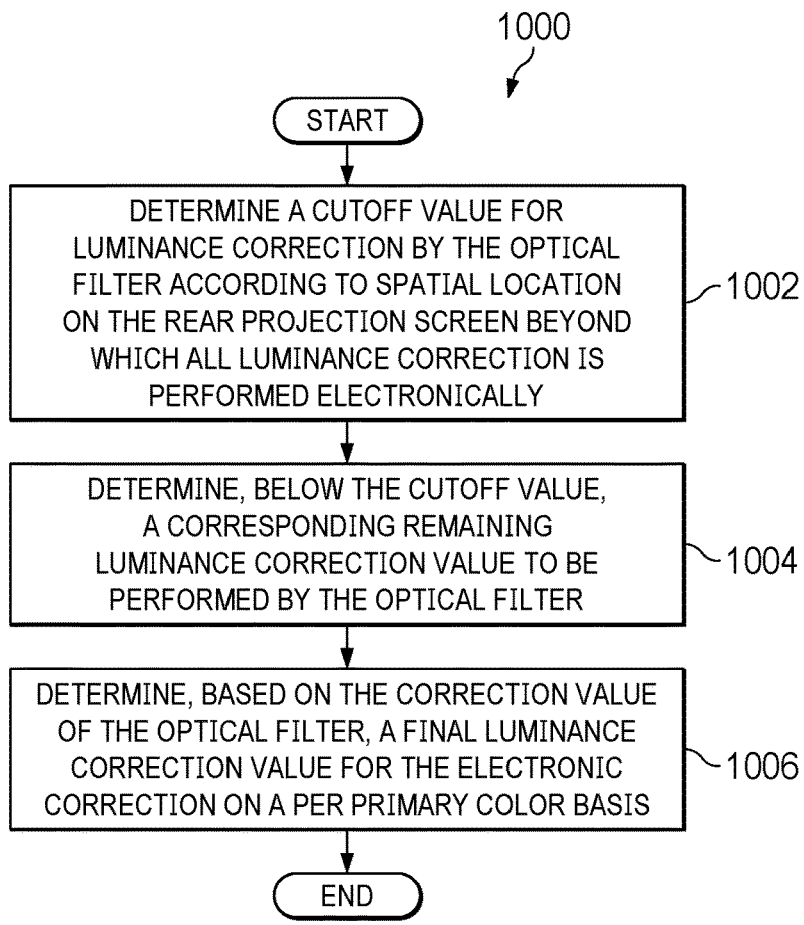
FIG. 10 depicts a flowchart of an alternate process for allocation luminance correction between the optical filter and electronic correction in accordance with an illustrative example.

FIG. 10 depicts a flowchart of an alternate process for allocation luminance correction between the optical filter and electronic correction in accordance with an illustrative example. Process 1000 is an example of an alternate implementation of operation 806 in FIG. 8.

Process 1000 begins by determining a cutoff value for luminance correction by the optical filter according to spatial location on the rear projection screen beyond which all luminance correction is performed electronically (operation 1002). Below the cutoff value a corresponding remaining luminance correction value is then determined to be performed by the optical filter (operation 1004). Based on the correction value of the optical filter, a final luminance correction value is determined for the electronic correction on a per primary color basis (operation 1006). Process 1000 then ends.

The flowcharts and block diagrams in the different depicted examples illustrate the architecture, functionality, and operation of some possible implementations of apparatuses and methods in an illustrative example. In this regard, each block in the flowcharts or block diagrams can represent at least one of a module, a segment, a function, or a portion of an operation or step. For example, one or more of the blocks can be implemented as program code, hardware, or a combination of the program code and hardware. When implemented in hardware, the hardware can, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams can be implemented using special purpose hardware systems that perform the different operations or combinations of special purpose hardware and program code run by the special purpose hardware.

In some alternative implementations of an illustrative example, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 11:
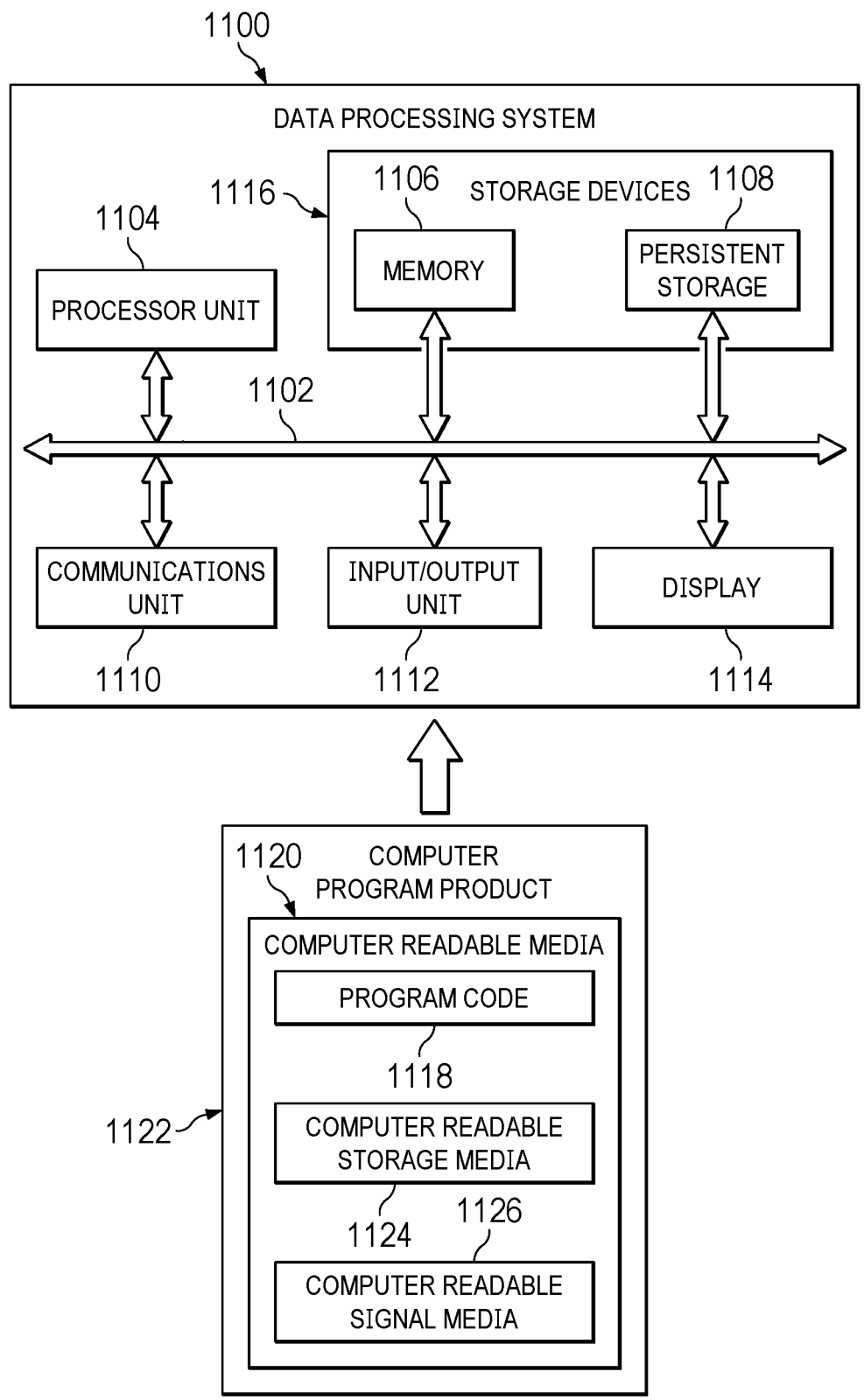
FIG. 11 is an illustration of a block diagram of a data processing system in accordance with an illustrative example.

Turning now to FIG. 11, an illustration of a block diagram of a data processing system is depicted in accordance with an illustrative example. Data processing system 1100 may be used to implement computer system 160 in FIG. 1. In this illustrative example, data processing system 1100 includes communications framework 1102, which provides communications between processor unit 1104, memory 1106, persistent storage 1108, communications unit 1110, input/output (I/O) unit 1112, and display 1114. In this example, communications framework 1102 takes the form of a bus system.

Processor unit 1104 serves to execute instructions for software that may be loaded into memory 1106. Processor unit 1104 may be a number of processors, a multi-processor core, or some other type of processor, depending on the particular implementation. In an example, processor unit 1104 comprises one or more conventional general-purpose central processing units (CPUs). In an alternate example, processor unit 1104 comprises one or more graphical processing units (GPUS).

Memory 1106 and persistent storage 1108 are examples of storage devices 1116. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1116 may also be referred to as computer-readable storage devices in these illustrative examples. Memory 1106, in these examples, may be, for example, a random access memory or any other suitable volatile or non-volatile storage device. Persistent storage 1108 may take various forms, depending on the particular implementation.

For example, persistent storage 1108 may contain one or more components or devices. For example, persistent storage 1108 may be a hard drive, a flash memory, a rewritable optical disk, a rewritable magnetic tape, or some combination of the above. The media used by persistent storage 1108 also may be removable. For example, a removable hard drive may be used for persistent storage 1108. Communications unit 1110, in these illustrative examples, provides for communications with other data processing systems or devices. In these illustrative examples, communications unit 1110 is a network interface card.

Input/output unit 1112 allows for input and output of data with other devices that may be connected to data processing system 1100. For example, input/output unit 1112 may provide a connection for user input through at least one of a keyboard, a mouse, or some other suitable input device. Further, input/output unit 1112 may send output to a printer. Display 1114 provides a mechanism to display information to a user.

Instructions for at least one of the operating system, applications, or programs may be located in storage devices 1116, which are in communication with processor unit 1104 through communications framework 1102. The processes of the different examples may be performed by processor unit 1104 using computer-implemented instructions, which may be located in a memory, such as memory 1106.

These instructions are referred to as program code, computer-usable program code, or computer-readable program code that may be read and executed by a processor in processor unit 1104. The program code in the different examples may be embodied on different physical or computer-readable storage media, such as memory 1106 or persistent storage 1108.

Program code 1118 is located in a functional form on computer-readable media 1120 that is selectively removable and may be loaded onto or transferred to data processing system 1100 for execution by processor unit 1104. Program code 1118 and computer-readable media 1120 form computer program product 1122 in these illustrative examples. In one example, computer-readable media 1120 may be computer-readable storage media 1124 or computer-readable signal media 1126.

In these illustrative examples, computer-readable storage media 1124 is a physical or tangible storage device used to store program code 1118 rather than a medium that propagates or transmits program code 1118. Computer-readable storage media 1124, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Alternatively, program code 1118 may be transferred to data processing system 1100 using computer-readable signal media 1126. Computer-readable signal media 1126 may be, for example, a propagated data signal containing program code 1118. For example, computer-readable signal media 1126 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 1100 are not meant to provide architectural limitations to the manner in which different examples may be implemented. The different illustrative examples may be implemented in a data processing system including components in addition to or in place of those illustrated for data processing system 1100. Other components shown in FIG. 11 can be varied from the illustrative examples shown. The different examples may be implemented using any hardware device or system capable of running program code 1118.

As used herein, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

As used herein, "a number of" when used with reference to items, means one or more items. For example, "a number of different types of networks" is one or more different types of networks. In illustrative example, a "set of" as used with reference items means one or more items. For example, a set of metrics is one or more of the metrics.

The description of the different illustrative examples has been presented for purposes of illustration and description and is not intended to be exhaustive or limited to the examples in the form disclosed. The different illustrative examples describe components that perform actions or operations. In an illustrative example, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

Many modifications and variations will be apparent to those of ordinary skill in the art. Further, different illustrative examples may provide different features as compared to other desirable examples. The example or examples selected are chosen and described in order to best explain the principles of the examples, the practical application, and to enable others of ordinary skill in the art to understand the disclosure for various examples with various modifications as are suited to the particular use contemplated.

What is claimed is:

1. A method of generating luminance uniformity in a rear projection display system, the method comprising:
   calculating luminance generated by a projector on a rear projection screen relative to a design eye position in front of the rear projection screen;
   determining a baseline luminance value for each primary color according to the calculated luminance, wherein luminance of all locations on the rear projection screen is corrected toward the baseline luminance value;
   determining an allocation between an optical filter and electronic correction to perform the correction to the baseline luminance value;

measuring luminance at a number of calibration points on the rear projection screen, wherein the calibration points are at fixed azimuth and elevation locations on the rear projection screen;

adjusting, according to the allocation and the luminance at the calibration points, the electronic correction for a color image to produce a corrected color image for projection from the projector; and projecting, from the projector, the corrected color image through the optical filter, wherein the optical filter is configured to dim specified areas within the corrected color image according to the allocation.

2. The method of claim 1, wherein determining the allocation between the optical filter and electronic correction comprises:

allocating all luminance correction that is common to all three primary colors to the optical filter; and allocating all remaining required luminance correction to electronic correction on a per primary color basis.

3. The method of claim 1, wherein determining the allocation between the optical filter and electronic correction comprises:

determining a cutoff value for luminance correction by the optical filter according to spatial location on the rear projection screen beyond which all luminance correction is performed electronically;

determining, below the cutoff value, a corresponding remaining luminance correction value to be performed by the optical filter; and determining, based on the luminance correction value of the optical filter, a final luminance correction value for the electronic correction on a per primary color basis.

4. The method of claim 1, wherein electronic correction is performed according to an alpha plane of the projector.

5. The method of claim 1, wherein adjusting the electronic correction further comprises creating a number of correction maps corresponding to primary colors generated by the projector based on measured luminance and color at each of the calibration points.

6. The method of claim 5, wherein data collected for each of the calibration points based on their azimuth and elevation location is mapped back to raster space of the projector.

7. The method of claim 5, further comprising performing interpolation and/or extrapolation to extend results for the calibration points to any location in projector raster space, wherein the interpolation and/or extrapolation is performed on decoded percentage of luminance attenuation needed.

8. The method of claim 1, wherein the baseline luminance value for each primary color comprises the minimum luminance for each primary color, and wherein percentage correction applied at each point on the screen is a ratio between the luminance at that point and the baseline luminance value.

9. The method of claim 1, wherein calculating luminance generated by the projector is performed during calibration of the projector.

10. The method of claim 1, wherein the optical filter comprises an opacity that varies spatially according to a calculated pattern based on the allocation.

11. A system of generating luminance uniformity in a rear projection display system, the system comprising:

a storage device that stores program instructions;

one or more processors operably connected to the storage device and configured to execute the program instructions to cause the system to:

calculate luminance generated by a projector on a rear projection screen relative to a design eye position in front of the rear projection screen;

determine a baseline luminance value for each primary color according to the calculated luminance, wherein luminance of all locations on the rear projection screen is corrected toward the baseline luminance value;

determine an allocation between an optical filter and electronic correction to perform the correction to the baseline luminance value;

measure luminance at a number of calibration points on the rear projection screen, wherein the calibration points are at fixed azimuth and elevation locations on the rear projection screen;

adjust, according to the allocation and the luminance at the calibration points, the electronic correction for a color image to produce a corrected color image for projection from the projector; and an optical filter positioned in a light path of the projector, wherein the optical filter is configured to dim specified areas within the corrected color image according to the allocation.

12. The system of claim 11, wherein determining the allocation between the optical filter and electronic correction comprises:

allocating all luminance correction that is common to all three primary colors to the optical filter; and allocating all remaining required luminance correction to electronic correction on a per primary color basis.

13. The system of claim 11, wherein determining the allocation between the optical filter and electronic correction comprises:

determining a cutoff value for luminance correction by the optical filter according to spatial location on the rear projection screen beyond which all luminance correction is performed electronically;

determining, below the cutoff value, a corresponding remaining luminance correction value to be performed by the optical filter; and determining, based on the luminance correction value of the optical filter, a final luminance correction value for the electronic correction on a per primary color basis.

14. The system of claim 11, wherein electronic correction is performed according to an alpha plane of the projector.

15. The system of claim 11, wherein adjusting the electronic correction further comprises creating a number of correction maps corresponding to primary colors generated by the projector based on measured luminance and color at each of the calibration points.

16. The system of claim 15, wherein data collected for each of the calibration points based on their azimuth and elevation location is mapped back to raster space of the projector.

17. The system of claim 15, further comprising performing interpolation and/or extrapolation to extend results for the calibration points to any location in projector raster space, wherein the interpolation and/or extrapolation is performed on decoded percentage of luminance attenuation needed.

18. The system of claim 11, wherein the baseline luminance value for each primary color comprises the minimum luminance for each primary color, and wherein percentage correction applied at each point on the screen is a ratio between the luminance at that point and the baseline luminance value.

19. The system of claim 11, wherein the optical filter comprises an opacity that varies spatially according to a calculated pattern based on the allocation.

20. A non-transitory computer program product for generating luminance uniformity in a rear projection display system, the computer program product comprising:
a computer-readable storage medium having program instructions embodied thereon to perform the steps of:
calculating luminance generated by a projector on a rear projection screen relative to a design eye position in front of the rear projection screen;
determining a baseline luminance value for each primary color according to the calculated luminance, wherein luminance of all locations on the rear projection screen is corrected toward the baseline luminance value;
determining an allocation between an optical filter and electronic correction to perform the correction toward the baseline luminance value;
measuring luminance at a number of calibration points on the rear projection screen, wherein the calibration points are at fixed azimuth and elevation locations on the rear projection screen;
adjusting, according to the allocation and the luminance at the calibration points, the electronic correction for a color image to produce a corrected color image for projection from the projector; and
calculating, based on the allocation, a pattern of spatially varied opacity for the optical filter.

* * * * *